United States Patent
Kobylivker et al.

[11] Patent Number: 6,002,064
[45] Date of Patent: Dec. 14, 1999

[54] STRETCH-THINNED BREATHABLE FILMS RESISTANT TO BLOOD AND VIRUS PENETRATION

[75] Inventors: Peter Michailovich Kobylivker, Marietta; Kevin George Hetzler, Alpharetta, both of Ga.

[73] Assignee: Kimberly-Clark Worldwide, Inc., Neenah, Wis.

[21] Appl. No.: 08/978,719

[22] Filed: Nov. 26, 1997

Related U.S. Application Data

[63] Continuation-in-part of application No. 08/777,504, Dec. 30, 1996.

[51] Int. Cl.$^6$ .............................. A61F 13/15; B32B 5/16
[52] U.S. Cl. ......................... 604/367; 604/358; 604/366; 428/323; 428/327; 428/339
[58] Field of Search ....................... 604/360, 383, 604/358, 367; 428/252, 286, 220, 315.5, 316.6, 323, 327, 339

[56] References Cited

U.S. PATENT DOCUMENTS

| | | |
|---|---|---|
| 3,338,992 | 8/1967 | Kinney . |
| 3,426,754 | 2/1969 | Bierenbaum et al. . |
| 3,502,538 | 3/1970 | Petersen . |
| 3,679,538 | 7/1972 | Druin et al. . |
| 3,802,817 | 4/1974 | Matsuki et al. . |
| 3,843,761 | 10/1974 | Bierenbaum et al. . |
| 3,844,865 | 10/1974 | Elton et al. . |
| 3,849,241 | 11/1974 | Butin et al. . |
| 3,932,682 | 1/1976 | Loft et al. . |
| 4,041,203 | 8/1977 | Brock et al. . |
| 4,105,737 | 8/1978 | Suzuki . |
| 4,138,459 | 2/1979 | Brazinsky et al. . |
| 4,256,625 | 3/1981 | Dachs ......................................... 260/40 |
| 4,257,997 | 3/1981 | Soehngen et al. . |
| 4,340,563 | 7/1982 | Appel et al. . |
| 4,367,322 | 1/1983 | Shiga et al. ............................. 526/137 |
| 4,386,129 | 5/1983 | Jacoby . |
| 4,519,909 | 5/1985 | Castro . |
| 4,539,256 | 9/1985 | Shipman . |
| 4,668,566 | 5/1987 | Braun . |
| 4,726,989 | 2/1988 | Mrozinski . |
| 4,791,144 | 12/1988 | Nagou et al. ............................. 521/90 |
| 4,801,494 | 1/1989 | Datta et al. . |
| 4,906,513 | 3/1990 | Kebbell et al. . |
| 4,921,652 | 5/1990 | Tsuji et al. . |
| 4,923,650 | 5/1990 | Antoon, Jr. et al. . |

(List continued on next page.)

FOREIGN PATENT DOCUMENTS

| | | |
|---|---|---|
| 115940 | 8/1984 | European Pat. Off. . |
| 145014 | 6/1985 | European Pat. Off. . |
| 434115 | 6/1991 | European Pat. Off. . |
| 444671 | 9/1991 | European Pat. Off. . |
| 554896 | 8/1993 | European Pat. Off. . |
| 645426 | 3/1995 | European Pat. Off. ........ C08L 23/10 |
| 697436 | 2/1996 | European Pat. Off. . |
| 03168229 | 7/1991 | Japan . |
| 1151321 | 5/1969 | United Kingdom . |

OTHER PUBLICATIONS

*Designation: F 1671–97a—Standard Test Method for Resistance of Materials Used in Protective Clothing to Penetration by Blood–Borne Pathogens Using Phi–X174 Bacteriophage Penetration as a Test System*, Copyright by the American Society For Testing and Materials, Annual Book of ASTM Standards, pp. 1–10.

*Primary Examiner*—John G. Weiss
*Assistant Examiner*—Miley Craig Peppers, III
*Attorney, Agent, or Firm*—Pauley Petersen Kinne & Fejer

[57] ABSTRACT

A stretch-thinned polymeric film is formed from a mixture of a polymer matrix including a low crystallinity propylene polymer having not more than about 30% crystallinity, with a particulate filler. The stretch-thinned film is breathable to water vapor yet resistant to penetration by liquids and viruses. The film can be laminated to a nonwoven web, and is useful in a wide variety of medical apparel and related products.

49 Claims, 2 Drawing Sheets

U.S. PATENT DOCUMENTS

| | | | |
|---|---|---|---|
| 4,985,023 | 1/1991 | Blank et al. | 604/360 |
| 4,994,335 | 2/1991 | Kamaei et al. . | |
| 5,008,296 | 4/1991 | Antoon, Jr. et al. . | |
| 5,032,450 | 7/1991 | Rechlicz et al. | 428/196 |
| 5,073,316 | 12/1991 | Bizen et al. . | |
| 5,169,712 | 12/1992 | Tapp | 428/315.5 |
| 5,173,235 | 12/1992 | Kamei et al. . | |
| 5,176,953 | 1/1993 | Jacoby et al. . | |
| 5,187,005 | 2/1993 | Stahle et al. | 428/252 |
| 5,236,963 | 8/1993 | Jacoby . | |
| 5,244,482 | 9/1993 | Hassenboehler, Jr. et al. . | |
| 5,258,156 | 11/1993 | Kurauchi et al. . | |
| 5,268,220 | 12/1993 | Tajima et al. | 428/220 |
| 5,272,326 | 12/1993 | Fujita et al. . | |
| 5,322,728 | 6/1994 | Davey et al. . | |
| 5,382,400 | 1/1995 | Pike et al. . | |
| 5,414,027 | 5/1995 | DeNicola, Jr. et al. | 522/112 |
| 5,467,765 | 11/1995 | Maturaporn . | |
| 5,468,807 | 11/1995 | Tsurutani et al. . | |
| 5,492,751 | 2/1996 | Butt, Sr. et al. . | |
| 5,543,206 | 8/1996 | Austin et al. . | |
| 5,560,974 | 10/1996 | Langley | 428/198 |
| 5,571,619 | 11/1996 | McAlpin et al. . | |
| 5,593,768 | 1/1997 | Gessner | 428/286 |
| 5,603,707 | 2/1997 | Trombetta et al. | 604/383 |
| 5,698,307 | 12/1997 | Levy | 428/316.6 |
| 5,800,758 | 9/1998 | Topolkaraev et al. | 264/154 |

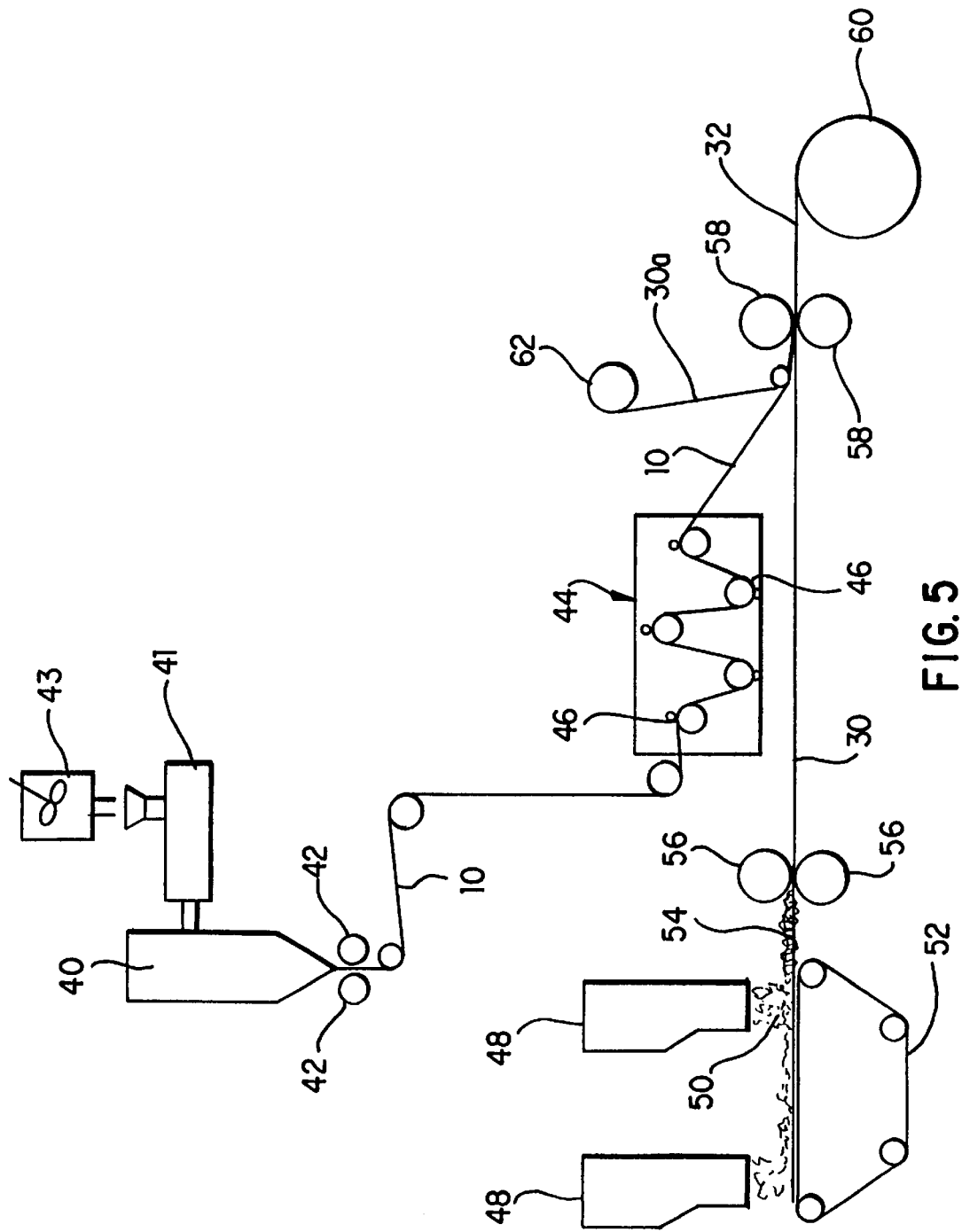

STRETCH-THINNED BREATHABLE FILMS RESISTANT TO BLOOD AND VIRUS PENETRATION

RELATED APPLICATION

This application is a continuation-in-part of pending U.S. patent application Ser. No. 08/777,504, filed on Dec. 30, 1996, the disclosure of which is incorporated by reference.

FIELD OF THE INVENTION

The present invention is directed to stretch-thinned polymeric films which are breathable to water vapor yet resistant to blood and virus penetration. The invention is also directed to laminates of the films to one or more nonwoven webs, which are useful for surgical gowns, caps, aprons and other medical applications.

BACKGROUND OF THE INVENTION

Polymeric films have been traditionally used to provide barrier properties in limited use or disposable items. The terms "limited use" and "disposable" mean that the product or component is used only once, or only a small number of times, before being discarded. Examples of such products include, but are not limited to, surgical and health care related products such as hospital drapes and gowns, disposable work wear such as coveralls and lab coats and personal care absorbent articles such as diapers, training pants, incontinence products, sanitary napkins, bandages, wipes and the like. In the area of protective apparel, films are used to prevent cross-exchange of microorganisms between the patient and the wearer. Films are used as the outer covers in personal care absorbent articles to prevent body wastes from contaminating the clothing, bedding and other aspects of the surrounding environment.

Lamination of films has been used to create materials that are impervious. Surgical gowns and the outer covers of premium-priced diapers are some examples. A primary purpose of the film in such laminations is to provide barrier properties. The laminates must also be tough, i.e., have high tensile strength in both the machine direction and the cross machine direction, for durability.

Vapor permeable, liquid impermeable polymeric films are also known in the art. One method of making a polymeric film vapor permeable, includes mixing a matrix polymer with a substantial quantity (e.g., 10–70% by weight) of an organic or inorganic particulate filler such as, for example, calcium carbonate, and extruding a film from the blend. The matrix polymer may include a polyolefin, for instance polypropylene or polyethylene, various olefin copolymers, and/or polymer blends. The film may be a monolayer film, a multilayer film which contains the filled layer as a primary layer, or a multilayer film having more than one filled layer.

Then, the film is heated and stretched, causing voids to form in the areas surrounding the filler particles. The voided film is characterized by thin polymer membranes and/or fine pore networks which permit the molecular diffusion of water vapor through the film, but which block the passage of liquids. In essence, a tortuous path is created from one film surface to the other which permits transfer of vapors but not liquids.

Breathable films are also used in surgical apparel. In the past, primary objectives have been to provide good water vapor transmission and make the gowns comfortable to the wearers. The film itself provides good vapor permeability and some liquid barrier, but often has low strength. The film can be laminated to one or more polymeric nonwoven webs to provide a laminate having good strength. Yet some of today's medical applications require surgical apparel which has increased barrier to liquids such as blood, and viruses (often contained in blood), when exposed to a liquid insult which may be under pressure. This objective requires a film that is liquid-impermeable, virus-impermeable, and strong.

SUMMARY OF THE INVENTION

The present invention is a water vapor permeable polymeric film which has increased barrier to liquids such as blood, and viruses, and which passes the bacteriophage (i.e. virus) penetration test defined in ASTM Procedure F1671. It has been found that tougher breathable films which possess these properties can be made using low crystallinity propylene polymers having not more than about 30% crystallinity, and blends containing them. The present invention is also directed to laminates which include the film of the invention with one or more nonwoven webs, and to medical apparel made from the film and laminates.

The low crystallinity propylene polymer can include up to 100% propylene having different stereoisomers of propylene in the polymer chain, to effect the low crystallinity. The low crystallinity propylene polymer can also be a copolymer containing up to about 6% by weight ethylene. The low crystallinity propylene polymer can also be a copolymer containing up to about 20% by weight of an alpha-olefin having four to eight carbon atoms. Blends containing one or more of these low crystallinity propylene polymers can also be used. In each case, the low crystallinity can be achieved by varying the stereoisomer content (e.g., atactic, isotactic, syndiotactic) in the propylene chain, and/or by raising the content of the comonomer. However, the ethylene content should not exceed about 6% of the polymer, because higher ethylene contents lead to lower tensile strengths in the film product.

The film is prepared by blending about 30–90% by weight of the polymer with about 10–70% by weight of a particulate filler to form a substantially homogeneous dispersion of the filler in the polymer. Then, the blend is extruded into either a single-layer film or a multilayer film having the filled layer as one of its components. The film is then stretched at an elevated temperature below the melting temperature of the polymer, by about 1.1–7.0 times its original length in at least one direction. As the film is stretched, voids form around the filler particles resulting in the breathable film.

Laminates of the film can be prepared by bonding the film to one or more nonwoven webs using thermal or adhesive bonding techniques known in the art. The laminates can be used in medical gowns, caps, aprons and related apparel. When bonding the film to a nonwoven web, it is important not to damage the film to such an extent that the liquid and viral barrier properties are compromised. It is also important that the film remain breathable to water vapor after the lamination. Adhesive bonding or low pressure thermal bonding techniques are preferred, wherein the bonding occurs at spaced-apart locations.

The foregoing and other aspects of the invention will become further apparent from the following detailed description of the presently preferred embodiments, read in conjunction with the accompanying drawings. The detailed description and drawings are intended to be illustrative rather than limiting, the scope of the invention being defined by the appended claims and equivalents thereof.

DEFINITIONS

The term "low crystallinity" refers to polymers that are not more than about 30% crystalline. The percent crystallinity can be determined using differential scanning calorimetry (DSC) by taking the heat of fusion of the second DSC scan and dividing it by 185 Joules per gram (the approximate heat of fusion of purely crystalline polypropylene). A more detailed description of the procedure is provided below.

The term "stereoisomers" of propylene polymers refers to the arrangement of the methyl groups along the polypropylene chains. There are three possible arrangements, known as "isotactic," "syndiotactic" and "atactic."

Isotactic polypropylene is predominately crystalline, due to the regular arrangement of the methyl groups on the same side of the polymer chain:

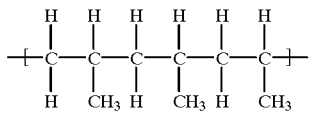

Syndiotactic polypropylene is also somewhat crystalline, due to the regular arrangement of the methyl groups on alternating sides of the polymer chain:

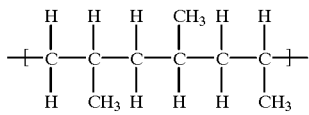

Atactic polypropylene is substantially amorphous, due to the irregular arrangement of the methyl groups on both sides of the polymer chain:

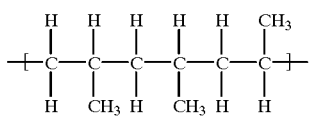

The term "virus penetration resistant" and "bacteriophage resistant" refer to films having barrier to viral penetration, which pass the bacteriophage penetration test set forth in ASTM F1671.

The term "breathable" refers to films having a water vapor transmission rate (WVTR) of at least 300 grams/m$^2$-24 hours, measured using the test procedure described below.

The term "nonwoven web" means a web having a structure of individual fibers or threads which are interlaid, but not in an identifiable, repeating manner. Nonwoven webs have been, in the past, formed by a variety of processes such as, for example, melt-blowing processes, spunbonding processes and bonded carded web processes.

The term "meltblown fibers" means fibers formed by extruding a molten thermoplastic material through a plurality of fine, usually circular, die capillaries as molten threads or filaments into a high velocity gas (e.g., air) stream which attenuates the filaments of molten thermoplastic material to reduce their diameter, possibly to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin et al., the disclosure of which is hereby incorporated by reference.

The term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawings or other well-known spunbonding mechanisms. The production of spunbonded nonwoven webs is illustrated in patents such as, for example, in U.S. Pat. No. 3,802,817 to Matsuki et al. and U.S. Pat. No. 5,382,400 to Pike et al. The disclosures of these patents are hereby incorporated by reference.

"Bonded carded webs" are webs made from staple fibers that are usually purchased in bales. The bales are placed in a picker which separates the fibers. The fibers are then sent through a combing or carding unit that breaks apart and aligns the staple fibers in the machine direction to form a generally machine direction-oriented fibrous nonwoven web. Once the web has been formed, it is bonded by one or more of several known bonding methods. One such bonding method is powder bonding wherein a powdered adhesive is distributed through the web and then activated, usually by heating the web and adhesive with hot air. Another bonding method is pattern bonding wherein heated calender rolls or ultrasonic bonding equipment is used to bond the fibers together, usually in a localized bond pattern, though the web can be bonded across its entire surface if desired. Another suitable and well-known method, particularly when using bicomponent staple fibers, is through-air bonding.

The term "polymer" generally includes, but is not limited to: homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

The term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates and materials added to enhance processability of the composition.

BRIEF DESCRIPTION OF THE DRAWINGS

FIG. 5 is a schematic diagram of a process for making a breathable polyolefin film and laminate.

DETAILED DESCRIPTION OF THE PRESENTLY PREFERRED EMBODIMENTS

The present invention is directed to tough breathable polyolefin films made using one or more polymers having low crystallinity. The films are resistant to penetration by blood and other liquids, and viruses, when exposed to an insult.

Figure 1:
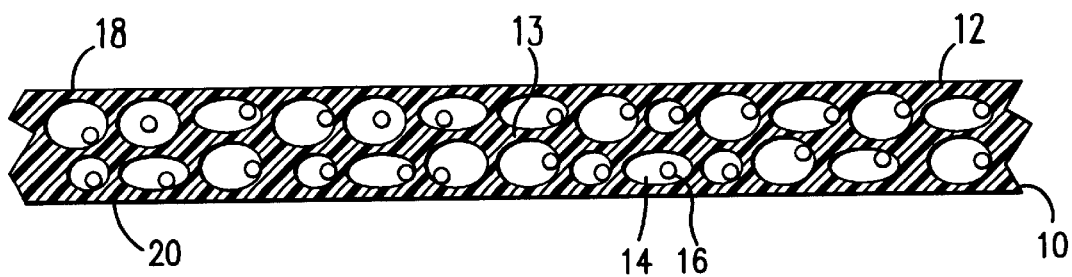
FIG. 1 is a cross-sectional view of a breathable polyolefin film of the invention having resistance to penetration by liquids and viruses.

Referring to FIG. 1, a single layer breathable polyolefin film 10 is shown. The film 10 includes a polymer matrix 12, a plurality of voids 14 surrounded by relatively thin microporous membranes 13 defining tortuous paths, and one or more filler particles 16 in each void 14. The film 10 is microporous and breathable. The microporous membranes 13 between the voids permit molecular diffusion of water vapor from a first surface 18 to a second surface 20 of the film 10.

The polymer matrix 12 includes (by weight of the matrix) from 50–100% of a low crystallinity propylene polymer, preferably from 70–100% of a low crystallinity propylene polymer, more preferably from 90–100% of a low crystallinity propylene polymer. The low crystallinity propylene polymer can include one or more homopolymer polypropylenes having not more than about 30% crystallinity. Generally, the low crystallinity can be achieved by including a sufficient quantity of atactic polypropylene, in the polymer backbone and/or polymer blend, such that the overall crystallinity is not greater than about 30%.

The low crystallinity propylene polymer can also include a copolymer of propylene with up to about 6% by weight ethylene, and/or a copolymer of propylene with up to 20% by weight, preferably about 10–20% by weight, of a $C_4$–$C_8$ alpha-olefin comonomer. If the copolymer is a random copolymer, the crystallinity may be sufficiently lowered by the mere presence of the comonomer. If the copolymer is a block copolymer, the crystallinity may or may not be sufficiently lowered by the comonomer, and it may be necessary to include atactic polypropylene in the polymer backbone and/or blend to achieve the desired low crystallinity.

One particularly suitable low crystalline propylene polymer is a random copolymer of propylene with butene, preferably about 10–20% by weight butene. Union Carbide WRD4-0224 is a random copolymer containing about 86% by weight propylene and about 14% by weight butene, having a melt flow rate (230° C.) of about 9–10 grams/10 min., and having a crystallinity of about 30%. Another suitable low crystalline propylene polymer is a random copolymer of propylene with about 2–6% by weight of ethylene. Union Carbide 6D82 is a random copolymer containing about 94.5% by weight propylene and about 5.5% by weight ethylene, having a melt flow rate (230° C.) of about 7 grams/10 min., and having a crystallinity of about 30%.

The foregoing propylene-butene copolymer and propylene-ethylene copolymer may be blended together in a weight ratio of about 9:1 to about 1:9, preferably about 7:3 to about 3:7, to form a low crystalline propylene polymer blend. Other suitable low crystallinity polymers include, without limitation, Rexene 13S25A, a random copolymer of about 97.5% propylene and about 2.5% ethylene available from the Rexene Corporation; Union Carbide 6D43, a random copolymer of about 97% propylene and about 3% ethylene available from the Union Carbide Corporation; and Union Carbide WRD60-277, a random copolymer of propylene and butylene.

The polymer matrix 12 may also include up to 50% (by weight of the matrix) of an additional polymer which does not have low crystallinity, preferably up to 30% and more preferably up to 10% of the additional polymer. Examples of suitable additional polymers include without limitation high and low density polyethylene, polypropylene, copolymers of mainly ethylene with about 5–15% by weight $C_3$–$C_{12}$ alpha-olefins (commonly known as linear low density polyethylene), copolymers of mainly ethylene with about 15–30% by weight $C_3$–$C_{12}$ alpha-olefins (commonly known as very low density polyethylene), copolymers of mainly propylene with ethylene and/or $C_4$–$C_{12}$ alpha-olefins, and flexible polyolefins including propylene-based polymers having both atactic and isotactic propylene groups in a main polypropylene chain. Other suitable additional polymers include without limitation elastomers, for example polyurethanes, copolyether esters, polyamide polyether block copolymers, ethylene vinyl acetate copolymers, block copolymers having the general formula A-B-A' or A-B such as copoly(styrene/ethylene-butene), styrene-poly(ethylene-propylene)-styrene, styrene-poly(ethylene-butylene)-styrene, polystyrene/poly(ethylene-butylene)/polystyrene, poly(styrene/ethylene-butylene/styrene), and the like.

One suitable additional polymer is very low density polyethylene, which is substantially amorphous and has a density of about 0.87–0.91 grams/cm$^3$. The very low density polyethylene can be made using a constrained geometry, metallocene, or a Ziegler-Natta catalyst, and is preferably made using a constrained geometry or metallocene catalyst. Another suitable additional polymer is a random propylene-ethylene copolymer including about 90–100% by weight propylene and about 0–10% by weight ethylene, preferably about 93–97% by weight propylene and about 3–7% by weight ethylene.

Constrained geometry and/or metallocene-catalyzed polyolefins are described, for instance, in U.S. Pat. Nos. 5,571,619; 5,322,728; and 5,272,326, the disclosures of which are incorporated herein by reference. Polymers made using metallocene catalysts have a very narrow molecular weight range. Polydispersity numbers (Mw/Mn) of below 4 and even below 2 are possible for metallocene-catalyzed polymers. These polymers also have a controlled short chain branching distribution compared to otherwise similar Ziegler-Natta catalyzed polymers. It is also possible, using a metallocene catalyst system, to closely control the isotacticity of the polymer.

The quantity of the additional polymer may be higher (i.e., closer to 50% of the matrix) when the low crystallinity polymer has a very low crystallinity, close to zero. When the low crystallinity polymer has a crystallinity close to 30%, the quantity of the additional polymer should be maintained at lower levels, for example, less than about 10% of the matrix.

The polymer matrix 12 constitutes about 30–90% by weight of the breathable, liquid impermeable, virus impermeable film layer 10, preferably about 35–75% by weight, most preferably about 35–60% by weight. The film layer 10 also includes about 10–70% by weight of at least one particulate inorganic and/or organic filler 16, preferably about 25–65% by weight, most preferably about 40–65% by weight. The filler particles 16 are preferably small, in order to maximize water vapor transmission through the voids 14. Generally, the filler particles 16 should have a mean particle diameter of about 0.1–7.0 microns, preferably about 0.5–7.0 microns, most preferably about 0.8–2.0 microns.

The filler particles 16 in the filled film layer 10 may be selected from a wide variety of inorganic and organic fillers. Suitable inorganic fillers include without limitation calcium carbonate, non-swellable clays, silica, alumina, barium sulfate, sodium carbonate, talc, magnesium sulfate, titanium dioxide, zeolites, aluminum sulfate, diatomaceous earth, magnesium carbonate, barium carbonate, kaolin, mica, carbon, calcium oxide, magnesium oxide, and aluminum hydroxide. The inorganic filler may also be a swellable material such as sodium bentonite clay.

Suitable organic fillers include non-swellable polymer particles as well as water-swellable superabsorbent particles. Natural superabsorbent particles include guar gum, agar, pectin and the like. Synthetic superabsorbent particles include hydrogel polymers such as alkali metal salts of polyacrylic acids, polyacrylamides, polyvinyl alcohol, ethylene-maleic anhydride copolymers, polyvinyl ethers, methyl cellulose, carboxymethylcellulose, hydroxypropyl cellulose, polyvinyl morpholinone, and polymers and copolymers of vinyl sulfonic acid, polyacrylates, polyacrylamides, polyvinyl pyrridine, and the like. Other suitable polymers include hydrolyzed acrylonitrile grafted starch, acrylic acid grafted starch, and isobutylene maleic anhydride polymers and mixtures thereof. The hydrogel polymers are preferably lightly crosslinked to render them substantially water insoluble. Crosslinking may be accomplished by irradiation or by covalent, ionic, Van Der Waals, or hydrogen bonding.

The polymer film thickness, composition, filler content, filler particle size and degree of stretching are factors which help determine the breathability of the liquid impermeable, virus impermeable film layer 10. Generally, the filled film layer 10 will be less than about 50 microns thick, preferably less than about 30 microns thick, more preferably less than about 20 microns thick. The filled film layer 10 may be uniaxially or biaxially stretched. The film layer 10 may be uniaxially stretched to about 1.1–7.0 times its original length, preferably to about 1.5–6.0 times its original length, more preferably to about 2.5–5.0 times its original length. The film layer 10 may alternatively be biaxially stretched using techniques familiar to persons skilled in the art.

Figure 2:
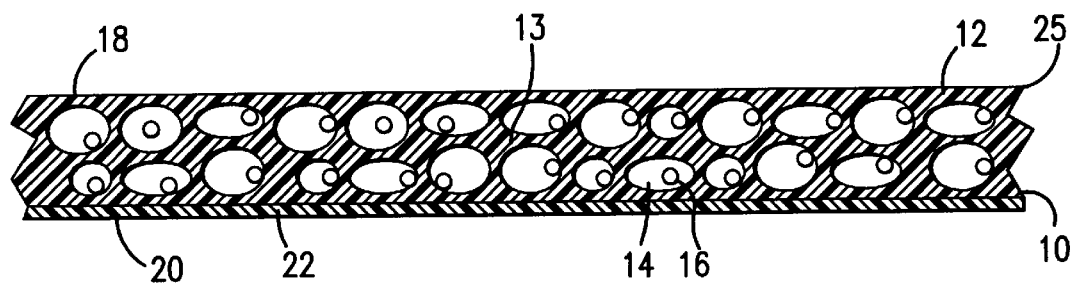
FIG. 2 is a cross-sectional view of a two-layer breathable polyolefin film including a breathable filled layer having resistance to penetration by liquids and viruses.
Figure 3:
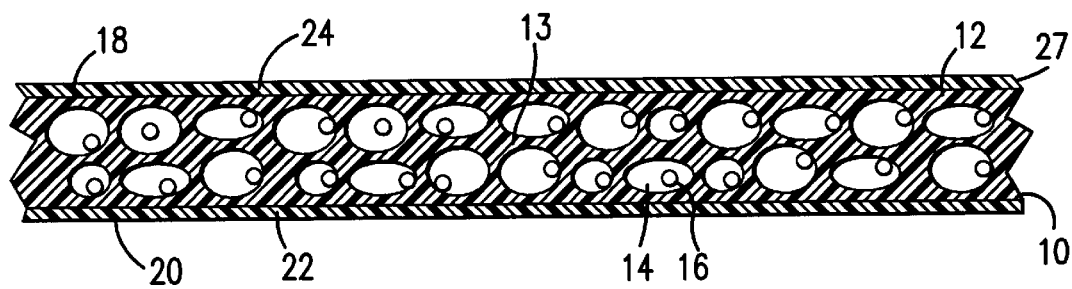
FIG. 3 is a cross-sectional view of a three-layer breathable polyolefin film including a breathable filled layer having resistance to penetration by liquids and viruses.

The filled film layer 10 may constitute the entire breathable, liquid and virus impermeable film, or may be part of a multilayer film. In the embodiment of FIG. 2, the breathable film layer 10 has a relatively thin outer skin layer 22 adjacent to it, in a two-layer film 25. In the embodiment of FIG. 3, the breathable film layer 10 is sandwiched between two outer skin layers 22 and 24, in a three-layer film 27. The inclusion of skin layers improves film processability and bacteriophage (virus) penetration resistance and can also contribute heat seal properties to the multilayer films 25 and 27. The multilayer films 25 and 27 can be prepared by cast or blown film coextrusion of the layers, by extrusion coating, or by any conventional layering process. The polymers in the skin layers 22 and 24 can be the same or different from the polymers in the breathable filled layer 10. The polymers in the outer layer or layers may have a lower softening point than in the breathable filled layer 10, and thus may contribute to the heat sealability of the films 25 and 27. The skin layer may or may not include a filler, and should be water vapor-breathable.

Also, the thickness and composition of the skin layers 22 and 24 should be selected so as not to substantially impair the moisture transmission through the breathable layer 10. After stretching the film, the skin layers 22 and 24 each are generally less than about 10 microns thick, preferably less than about 5 microns thick, more preferably less than about 2.5 microns thick. After stretching, the overall film preferably has a basis weight of not more than about 25 grams/m$^2$. Preferred skin layer polymers include ethylene vinyl acetates, propylene vinyl acetates, ethylene methyl acrylates, polystyrenes, polyamides, other vapor-permeable polymers, and blends of these with each other and with other polyolefins. The skin layers 22 and 24 may also include lesser quantities (e.g., about 0–40% by weight) of particulate fillers to further enhance their breathability.

Regardless of whether the breathable filled layer 10 is a monolayer film or a constituent of a multilayer film, the overall film should be constructed to function as a breathable microporous film having a water vapor transmission rate (WVTR) of at least about 300 grams/m$^2$-24 hours, measured using the procedure described below. Preferably, the overall film should have an WVTR of at least about 1200 grams/m$^2$-24 hours, most preferably at least about 2000 grams/m$^2$-24 hours. The breathable filled layer 10 is also constructed to provide the overall film with viral penetration resistance, evidenced by the ability of the film to pass the bacteriophage penetration test (ASTM F1671), which is incorporated by reference.

FIG. 5 illustrates a process for preparing a breathable, liquid and virus-impermeable film, and a laminate of the film to a nonwoven web. Referring to FIG. 5, the film 10 is formed from a film extrusion apparatus 40, which can be a cast or blown film unit, and which can be in-line or off-line. Typically, the apparatus 40 will include an extruder 41. Filled resin including the polymer matrix material and filler is prepared in a mixer 43 and directed to extruder 41. The film 10 is extruded between a pair of nip or chill rollers 42, one of which may be patterned to impart an embossed pattern to the newly formed film 10. The film may alternatively be flat cast onto only one chill roller.

From the film extrusion apparatus 40 or off-line supply rolls, the filled film 10 is directed to a film stretching unit 44 which can be a machine direction orienter, commercially available from vendors including the Marshall and Williams Co. of Providence, R.I. The stretching unit 44 includes a plurality of pairs of stretching rollers 46, with each subsequent pair moving at a progressively faster speed than the preceding pair. The rollers 46 apply an amount of stress and progressively stretch the filled film 10 to a stretched length, where the film 10 becomes voided and breathable. As shown, the film 10 is stretched only in the machine direction, which is the direction of travel of the film 10 through the process in FIG. 5.

Advantageously, the film 10 may be uniaxially stretched to about 3–4 times its original length, using an elevated stretch temperature of about 150–200° F. for most polyolefin-based films. The elevated stretch temperature can be sustained by heating some of the stretch rollers 46. The optimum stretch temperature varies with the type of matrix polymer in the film 10, and is always below the melting temperature of the matrix polymer.

Figure 4:
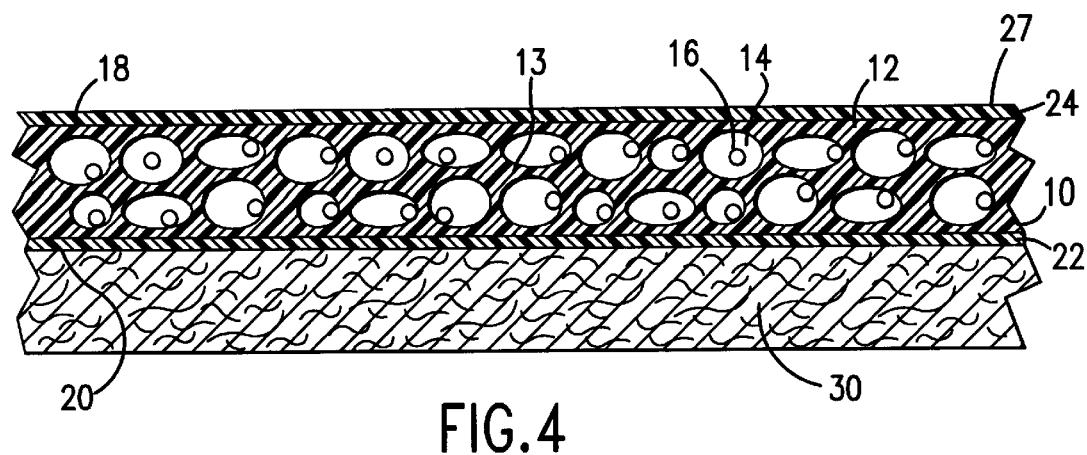
FIG. 4 is a cross-sectional view of a laminate including a breathable polyolefin film having resistance to penetration by liquids and viruses, and a spunbond web.

The liquid and virus impermeable, breathable voided film 10 may be laminated to one or more substrates, such as a conventional nonwoven web, using conventional adhesive bonding or thermal bonding techniques known in the art. The type of substrate and bonding will vary depending on the end use application. An example of a laminate is shown in FIG. 4, wherein a nonwoven web 30 is laminated to the multilayer film 27 of FIG. 3. In the embodiment shown, the web 30, which can be a spunbonded web of polypropylene or polyethylene, is bonded to the heat seal layer 22 of the multilayer film 27 to form a laminate suitable for use in surgical gowns, other medical apparel, and other breathable end use applications.

Referring again to FIG. 5, the film 10 may be laminated to nonwoven web 30 immediately after the film is stretched and immediately following manufacture of the nonwoven web. The nonwoven web 30, which can be a spunbonded web, is formed by dispersing polymer filaments 50 from a pair of conventional spinnerettes 48, onto a conveyor assembly 52. The filaments 50 are deposited onto the conveyor to form mat 54. The filaments 50 of mat 54 are then compressed to cause inter-filament bonding using a pair of nip rollers 56, resulting in the spunbonded web 30. The spunbonded web 30 is then transported to the calender bonding rollers 58 and is thermally bonded to one side of the film 10. The film 10 in FIG. 5 is simultaneously bonded on its other side to a second material 30a originating from a supply roll 62. The second material 30a may be a second nonwoven web, or another film layer. The resulting laminate 32 is wound and stored onto a supply roll 60. Alternatively, the nonwoven webs 30 and 30a may be a meltblown web, a laminate of a spunbond web and a meltblown web, a bonded carded web, or any nonwoven web or combination of nonwoven webs.

The materials 30 and 30a may also be stretchable nonwoven webs such as, for example, necked polypropylene spunbond webs, crimped polypropylene spunbond webs, bonded carded webs, elastomeric spunbond webs and meltblown fabrics produced from elastomeric resins. Fibrous nonwoven webs can impart additional properties such as a softer, more cloth-like feel to the film. A more cloth-like feel is particularly advantageous when the film is being used as a barrier layer in, for example, surgical gowns and drapes and other forms of apparel.

The calender bonding process described above is a form of thermal bonding. The thermal bonding involves passing the film 10 and the support layers 30 and 30a through the nip formed between a pair of laminating rolls 58, one or both of which may be heated. Also, at least one of the rolls 58 may be patterned to create a discrete bond pattern with a prescribed bond surface area for the resultant laminate 32. Generally, the maximum bond point surface area for a given area of surface on one side of the laminate 32 will not exceed about 50% of the total surface area. Any of a number of discrete bond patterns may be used. Examples are disclosed in U.S. Pat. No. 4,041,203 to Brock et al., which is incorporated herein by reference.

Bonding methods other than thermal point bonding may also be used to bond the support layers 30 and 30a to the film 10. Suitable alternatives include, for example, adhesive bonding and tackifiers. The adhesive can be applied by, for example, melt spraying, printing or meltblowing. Various types of adhesives are available including those produced from amorphous polyalphaolefins, ethylene vinyl acetate-based hot melts and KRATON® brand adhesives available from Shell Chemical Company of Houston, Tex.

When tackifiers are used to bond the film and the support layer, the tackifier may be incorporated into the film itself. The tackifier essentially serves to increase adhesion between the film and fiber layers. The film and fiber laminate may subsequently be thermal point bonded, although little heat is generally required because the tackifier tends to increase the pressure sensitivity of the film, and a bond somewhat like an adhesive bond can be formed. Examples of useful tackifiers include Wingtack™ 95, available from Goodyear Tire and Rubber Company of Akron, Ohio and Escorez™ 5200, available from Exxon Chemical of Houston, Tex.

The liquid and virus-resistant, breathable film 10 and laminates including it can be used in a wide variety of medical apparel including surgical caps and gowns, aprons, gloves, and other garments and apparel. Other uses are also possible for the film and laminates. The film 10 provides the apparel with breathability to water vapor and resistance to penetration by blood, other liquids, and viruses. The nonwoven web or webs in the laminates provide the apparel with increased strength as well as softness and a cloth-like feel.

Other examples of laminates and end uses in which the liquid and virus-resistant, breathable film 10 may be useful are described in various patents and patent applications assigned to Kimberly-Clark World Wide, Inc. These include without limitation U.S. application Ser. No. 08/359,986, filed 20 Dec. 1994; U.S. application Ser. No. 08/755,692, filed 25 Nov. 1996; and U.S. application Ser. No. 08/777,365, filed 27 Dec. 1996. These patent applications are incorporated herein by reference in their entirety.

TEST PROCEDURES

Viral Barrier (Bacteriophage Penetration Test)

The bacteriophage penetration test set forth in ASTM F1671 is used to determine the resistance of films to viral penetration. Specifically, the test is designed to measure the resistance of materials used in protective clothing to penetration by blood-borne pathogens using a surrogate microbe under conditions of continuous liquid contact. The results are reported as "pass" or "fail" based on the detection or absence of viral penetration. The test procedure is quite detailed, and is fully described in ASTM F1671A, published by the American Society For Testing And Materials Water Vapor Transmission Rate (WVTR)

The following procedure is described for testing of the water vapor transmission rate (WVTR) for the breathable, liquid and virus-resistant films of the invention. The WVTR is measured in a manner similar to ASTM Standard Test Method for Water Vapor Transmission of Materials, Designation E-96-80 as follows. For the purposes of the present invention, 3 inch diameter (76 mm) circular samples are cut from the test material and from a control material, CELGARD® 2500 (Hoechst Celanese Corporation). CELGARD 2500 is a 0.0025 cm thick film composed of microporous polypropylene. Two or three samples are prepared for each material. Test cups used for testing are cast aluminum, flanged, 2 inches deep and come with a mechanical seal and neoprene gasket. The cups are distributed by Thwing-Albert Instrument Company, Philadelphia, Pa., under the designation Vapometer Cup #681. One hundred millimeters of distilled water is poured into each Vapometer cup, and each of the individual samples of the test materials and control material are placed across the top area of an individual cup. Flanges are tightened to form a seal along the edges of the cups leaving the associated test material or control material exposed to the ambient atmosphere over a 62 millimeter diameter circular area (an open, exposed area of about 30 $cm^2$). The cups are then weighed, placed on a tray, and set in a forced air oven set at 100° F. (38° C.). The oven is a constant temperature oven with external air through it to prevent water vapor accumulation inside. A suitable forced air oven is, for example, a Blue M Power-O-Matic 60 oven distributed by Blue M Electric Co. of Blue Island, Ill. After 24 hours, the cups are removed from the oven and weighed. The preliminary, test WVTR value is calculated as follows:

Test WVTR=[(grams weight loss over 24 hours)×7571]÷24

The relative humidity within the oven is not specifically controlled. Under predetermined set conditions of 100° F. and ambient relative humidity, the WVTR for CELGARD 2500 has been determined to be 5000 $g/m^2/24$ hours. Accordingly, CELGARD 2500 is run as a control sample with each test and the resulting values are corrected in accord with the variation of the control relative to its known WVTR.

Degree of Crystallinity

The standard way to determine the degree of crystallinity is to perform a differential scanning calorimetry (DSC)

heating run at a constant heating rate of between about 10–20° C. per minute, up to a temperature 20–30° C. higher than the peak melting temperature of the polymer. The area under the melting peak curve normalized to the weight of the specimen is the heat of fusion (DH). Most modern DSC instruments execute the integration and normalization automatically. The units of DH can be Joules/gram, calories/gram or calories/mole.

Then, the percent crystallinity (X %) is computed from the following equation:

$$X\% = (DH/DH_o) \times 100$$

where $DH_o$ is the heat of fusion of a similar polymer having 100% crystallinity. The $DH_o$ values for known polymers are tabulated in various reference handbooks, for example, Brandrup & Immergut's "Polymer Handbook," Third Edition, John Wiley & Sons Inc. (1989).

EXAMPLES

Two filled polymer formulations were compounded, made into film on a blown film line, and then uniaxially stretched using a machine direction orienter. The compositions were as follows:

| | Example 1 Sample #P5058-55K | |
|---|---|---|
| 64% | ECC FL-2029 Coated filler (1 micron, 8 microns top, marble) | |
| 36% | 65% Union Carbide WRD4-0224 (14% C4, 9–10 MFR) | 23.4% Total |
| | 35% Union Carbide 6D82 (5.5% C2, 7 MFR) | 12.6% Total |
| | 600 ppm Ronotec Dry 17 Stabilizer (300 ppm effective) | |
| | 600 ppm Irgafos 168 Phosphite | |
| | Example 2 Sample #P5058-55M | |
| 64% | ECC FL-2029 Coated filler (1 micron, 8 microns top, marble) | |
| 36% | 35% Union Carbide WRD4-0224 (14% C4, 9–10 MFR) | 12.6% Total |
| | 65% Union Carbide 6D82 (5.5% C2, 7 MFR) | 23.4% Total |
| | 600 ppm Ronotec Dry 17 Stabilizer (300 ppm effective) | |
| | 600 ppm Irgafos 168 Phosphite | |

The oriented films were tested for water vapor breathability (WVTR) and viral penetration (bacteriophage) resistance (ASTM F1671). The following results were obtained.

| Example | Amount of Stretching | WVTR, grams/m² - 24 hours | Bacteriophage Test |
|---|---|---|---|
| 1 | 4.4× | 4900 | Passed (3 of 3 samples) |
| 2 | 3.7× | 2400 | Not Tested |

While the embodiments disclosed herein are presently considered preferred, various modifications and improvements can be made without departing from the spirit and scope of the invention. The scope of the invention is indicated by the appended claims, and all changes that fall within the meaning and range of equivalency are intended to be embraced therein.

We claim:

1. A breathable, stretch-thinned film including a film layer which is resistant to liquid and virus penetration, the film layer comprising:

about 30–90% by weight of a polymer matrix including a low crystallinity propylene polymer; and about 10–70% by weight of a particulate filler disposed within the matrix;

the film having a WVTR of at least about 300 grams/M² - 24 hours;

the film passing the bacteriophage penetration test set forth in ASTM F1671.

2. The film of claim 1, wherein the polymer matrix comprises at least 50% of the low crystallinity propylene polymer, by weight of the matrix.

3. The film of claim 1, wherein the polymer matrix comprises at least 70% of the low crystallinity propylene polymer, by weight of the matrix.

4. The film of claim 1, wherein the polymer matrix comprises at least 90% of the low crystallinity propylene polymer, by weight of the matrix.

5. The film of claim 1, wherein the low crystallinity propylene polymer comprises a polypropylene homopolymer or blend thereof having not more than about 30% crystallinity.

6. The film of claim 1, wherein the low crystallinity propylene polymer comprises a propylene-ethylene copolymer having up to 6% by weight ethylene.

7. The film of claim 1, wherein the low crystallinity propylene polymer comprises a copolymer of propylene with up to 20% by weight of an alpha-olefin comonomer having 4 to 8 carbon atoms.

8. The film of claim 7, wherein the alpha-olefin comonomer comprises butene.

9. The film of claim 7, wherein the alpha-olefin comonomer constitutes about 10–20% by weight of the propylene copolymer.

10. The film of claim 1, wherein the low crystallinity propylene polymer comprises a propylene-ethylene copolymer and a propylene-butene copolymer.

11. The film of claim 10, wherein the two copolymers are present in a weight ratio of about 9:1 to about 1:9.

12. The film of claim 10, wherein the two copolymers are present in a weight ratio of about 7:3 to about 3:7.

13. The film of claim 1, wherein the polymer matrix further comprises at least one additional polymer.

14. The film of claim 13, wherein the at least one additional polymer constitutes not more than 50% by weight of the polymer matrix.

15. The film of claim 13, wherein the at least one additional polymer is selected from the group consisting of polyethylene homopolymers and copolymers, polypropylene homopolymers and copolymers, elastomers, and combinations thereof.

16. The film of claim 13, wherein the at least one additional polymer comprises very low density polyethylene.

17. The film of claim 1, wherein the film layer resistant to liquid and virus penetration comprises about 35–75% by weight of the polymer matrix and about 25–65% by weight of the particulate filler.

18. The film of claim 1, wherein the film layer resistant to liquid and virus penetration comprises about 35–60% by weight of the polymer matrix and about 40–65% by weight of the particulate filler.

19. The film of claim 1, wherein the particulate filler comprises an inorganic filler.

20. The film of claim 19, wherein the inorganic filler comprises calcium carbonate.

21. The film of claim 1, wherein the particulate filler comprises an organic filler.

22. The film of claim 21, wherein the organic filler comprises a superabsorbent polymer.

23. The film of claim 1, stretch oriented at least uniaxially to about 1.1–7.0 times an original length.

24. The film of claim 1, stretch oriented at least uniaxially to about 1.5–6.0 times an original length.

25. The film of claim 1, stretch oriented at least uniaxially to about 2.5–5.0 times an original length.

26. A breathable stretch-thinned film comprising:
   at least one film layer resistant to liquid and virus penetration; and
   at least one additional film layer;
   the film layer resistant to liquid and virus penetration and including about 30–90% by weight of a polymer matrix and about 10–70% by weight of a particulate filler dispersed within the matrix;
   the polymer matrix including a low crystallinity propylene polymer;
   the film having a WVTR of at least about 300 grams/m$^2$ - 24 hours;
   the film passing the bacteriophage penetration test set forth in ASTM F1671.

27. The film of claim 26, comprising two of the additional film layers surrounding the film layer resistant to liquid and virus penetration.

28. The film of claim 26, wherein the additional film layer comprises a vapor-permeable polymer having a lower softening point than the film layer resistant to liquid and virus penetration.

29. The film of claim 26, wherein the additional film layer comprises a polymer selected from the group consisting of ethylene vinyl acetates, propylene vinyl acetates, ethylene methylacrylates, polystyrenes, polyamides, blends of the foregoing with each other, and blends of the foregoing with other polymers.

30. The film of claim 26, wherein the low crystallinity propylene polymer matrix comprises a propylene homopolymer or blend thereof having not more than about 30% crystallinity.

31. The film of claim 26, wherein the low crystallinity propylene polymer comprises a propylene-ethylene copolymer having up to 6% by weight ethylene.

32. The film of claim 26, wherein the low crystallinity propylene polymer comprises a copolymer of propylene with up to 20% by weight of an alpha-olefin comonomer having 4 to 8 carbon atoms.

33. The film of claim 32, wherein the alpha-olefin comonomer comprises butene.

34. The film of claim 26, wherein the low crystallinity propylene polymer comprises a propylene-ethylene copolymer and a propylene-butene copolymer.

35. The film of claim 26, wherein the polymer matrix further comprises at least one additional polymer.

36. The film of claim 26, stretch oriented at least uniaxially to about 1.1–7.0 times an original length.

37. The film of claim 26, stretch oriented at least uniaxially to about 1.5–6.0 times an original length.

38. The film of claim 26, stretch oriented at least uniaxially to about 2.5–5.0 times an original length.

39. A laminate comprising:
   a nonwoven web; and
   a breathable stretch-thinned film including a film layer which is resistant to liquid and virus penetration;
   the film layer including about 30–90% by weight of a polymer matrix and about 10–70% by weight of a particulate filler dispersed within the matrix;
   the polymer matrix including a low crystallinity propylene polymer;
   the film passing the bacteriophage penetration test set forth in ASTM F1671.

40. The laminate of claim 39, comprising two nonwoven webs laminated on both sides of the breathable stretch-thinned film.

41. The laminate of claim 39, wherein the nonwoven web comprises a spunbond web.

42. The laminate of claim 39, wherein the nonwoven web comprises a meltblown web.

43. The laminate of claim 39, wherein the nonwoven web comprises a bonded carded web.

44. The laminate of claim 39, wherein the film and web are adhesively bonded together.

45. The laminate of claim 39, wherein the film and web are thermally bonded together.

46. A surgical gown comprising the laminate of claim 39.
47. A surgical cap comprising the laminate of claim 39.
48. A medical glove comprising the laminate of claim 39.
49. A medical apron comprising the laminate of claim 39.

* * * * *